Sept. 21, 1937.   S. KRAEMER   2,093,610

NAIL

Filed July 13, 1936

Inventor
Sebastian Kraemer;
By R. S. Burnh
Attorney

Patented Sept. 21, 1937

2,093,610

UNITED STATES PATENT OFFICE 2,093,610

NAIL

Sebastian Kraemer, Los Angeles, Calif.

Application July 13, 1936, Serial No. 90,305

4 Claims. (Cl. 85—21)

This invention relates to a nail and more particularly pertains to a nail of the large headed type commonly employed in nailing wall boards and similar sheet materials in place on a supporting structure.

Nails of the above character as commonly constructed are formed of wire with narrow pointed shanks, flat heads and with transverse anchoring corrugations extending along the shank from adjacent the head to adjacent the base of the nail point. Such nails are further characterized by a relatively wide flat surface on the under side of the head extending at an angle from the point of intersection of the head with the shank. This construction has been found to be faulty in that the corrugations offer such resistance to the penetration of the nail in driving it into wood that the flat heads by reason of their angular intersection with the shank are frequently broken from the shank thus rendering the nail ineffectual.

The object of the present invention is to provide a construction in the nail shank and its intersection with the head such as to obviate the above named objectionable features in nails of this type now generally in use, and to produce a nail which may be easily driven into wood without danger of breakage of the head.

With the foregoing objects in view together with such other objects and advantages as may subsequently appear the invention is carried into effect as illustrated in the accompanying drawing, in which.

Figure 1:
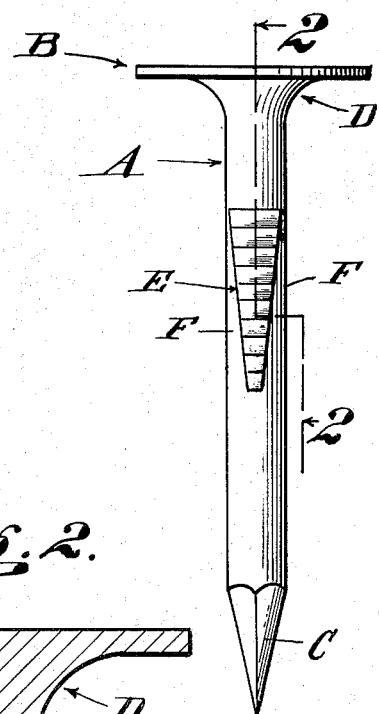
Fig. 1 is a view of the nail on an enlarged scale as seen in side elevation.

Referring to the drawing more specifically, A indicates generally the nail shank which is formed of wire of twelve to thirteen gage and B designates the head of the nail which is formed integral with the shank A and is of circular or approximately circular outline and of a diameter of approximately three-eighths of an inch. The nail head is shown as having a true circular periphery, but it will be understood that due to the methods of manufacturing nails of this type the produced nails will frequently be formed with the heads of an irregular outline.

The shank of the nail may obviously be of any suitable length from the head to the tip of the shank which latter is formed with a point C in conventional fashion.

Figure 2:
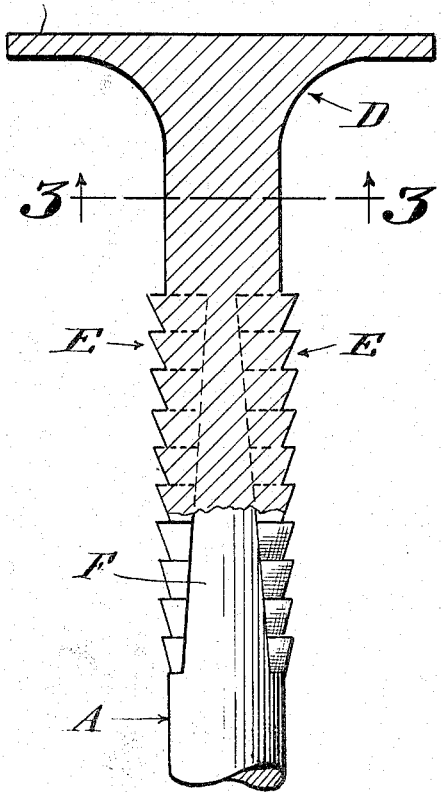
Fig. 2 is a view in section and elevation taken on the line 2—2 of Fig. 1.
Figure 3:
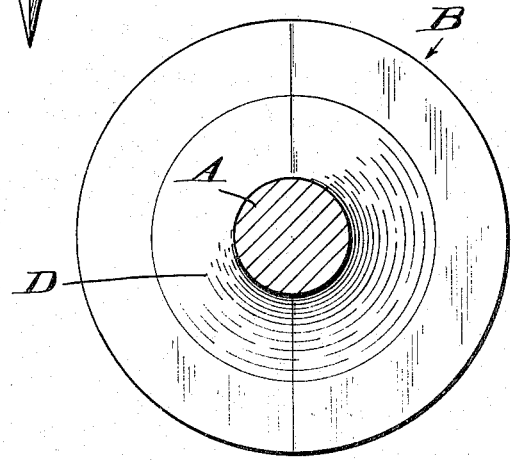
Fig. 3 is a view in section and elevation taken on the line 3—3 of Fig. 2 as seen in the direction indicated by the arrows and showing the under side of the nail head.

In carrying out the invention a fillet D is formed at the intersection of the shank A with the head B which fillet is in the form of a cove having a contour approximating a quadrant and which fillet is of a dimension such that the margin thereof intersecting the nail head will merge with the flat under face of the latter at a point approximately mid-way between the periphery of the shank and the perimeter of the head as particularly shown in Fig. 2. By the provision of a fillet of the formation and arrangement set forth the juncture of the shank and head is considerably reinforced and in a fashion to minimize rupturing of nail at the intersection of the shank and head or breaking of the nail head such as to effect its separation from the shank. Furthermore by spacing the marginal portion of the fillet merging into the head inwardly from the perimeter of the latter ample flat surface is afforded on the under side of the nail head to effect wide surface contact between the nail head and the material engaged thereby, as is essential in nails of this character.

Furthermore in carrying out the invention the shank A is formed with a series of anchoring corrugations which extend in the direction of their lengths circumferentially of the shank; there being a group E of such corrugations provided on diametrically opposed sides of the shank with the marginal portions of each of the groups spaced apart to afford a smooth unobstructed surface F between the groups of corrugations leading in continuation of the contour of the portions of the shank extending from each end of the corrugations.

An important feature of the invention resides in tapering the assemblage of each group of the corrugations to impart a wedge shape thereto with the small end thereof outermost on the shank and with the enlarged end thereof innermost on the shank. The individual corrugations of each group E are thus successively of gradually increasing lengths leading from the outermost to the innermost corrugations.

Each group of corrugations are also wedge shaped radially of the shank and in the direction of the length of the shank with the reduced portion thereof outermost on the shank and the enlarged portion innermost thereon. In other words the outermost corrugations of the groups E protrude slightly from the shank while the successive corrugations leading upward on the shank protrude progressively at greater distances from the shank. By this arrangement the groups of corrugations have a double wedge contour; first along their end margins and second along their front margins.

The groups E of corrugations are arranged with the outermost corrugations located at a point mid-way of the length of the shank so that in driving the nail one half of the shank will penetrate the material in which the nail is driven before the corrugated portion thereof engages the material. By this arrangement initial penetration of the nail is effected with a minimum of resistance, so that a blow imposed on the head of the nail in starting penetration of the nail may be comparatively light thus minimizing possibility of bending the nail on starting driving thereof.

On driving the nail to its set position the double wedge contour of the anchoring corrugations reduces resistance to penetration of the inner portion of the nail shank to a minimum thus requiring but a slightly heavier blow on the head of the nail to effect setting thereof, where more than one blow is required in driving the nail.

In order to avoid weakening of the shank adjacent its connection with the head the inner corrugations are spaced from the head a distance slightly exceeding a distance approximating one-half the diameter of the head.

By the provision of the fillet D the point of intersection between the head and shank is reinforced in such fashion that in event of a blow being delivered to the nail head striking the latter off-center will not be apt to fracture the nail head at its juncture with the shank, and furthermore the action of the shank as a punch tending to perforate the nail head on driving the nail is obviated, which with the decreased resistance to penetration of the nail afforded by the tapered arrangement of the anchoring corrugations, insures against destruction of the head on driving the nail. The reinforcement at the juncture of the shank and head and the wedge arrangement of the anchoring corrugations thus cooperate in rendering the nail more durable and effective in its application.

I claim:

1. In a wire nail having a pointed shank and a head on the shank, a coved fillet at the intersection of the head and shank merging into a flat face on the underside of the head midway between the shank and the margin of the head, and groups of corrugations on opposite side portions of the shank arranged with the corrugations extending in the direction of their lengths circumferentially of the shank, said groups of corrugations being wedge shaped both laterally and radially of the shank with the small end thereof presented to the pointed end of the shank and the large end presented toward the head.

2. In a wire nail having a pointed shank and a head on the shank, a coved fillet at the intersection of the head and shank merging into a flat face on the underside of the head midway between the shank and the margin of the head, and groups of corrugations on opposite side portions of the shank arranged with the corrugations extending in the direction of their lengths circumferentially of the shank, said groups of corrugations being wedge shaped both laterally and radially of the shank with the small end thereof presented to the pointed end of the shank and the large end presented toward the head, the small ends of the groups of corrugations being located approximately mid-way of the length of the shank.

3. In a wire nail having a pointed shank and a head on the shank, a coved fillet at the intersection of the head and shank merging into a flat face on the underside of the head mid-way between the shank and the margin of the head, and groups of corrugations on opposite side portions of the shank arranged with the corrugations extending in the direction of their lengths circumferentially of the shank, said groups of corrugations being wedge shaped both laterally and radially of the shank with the small end thereof presented to the pointed end of the shank and the large end presented toward the head, the small ends of the groups of corrugations being located approximately mid-way of the length of the shank, there being a smooth surface between the groups of corrugations on diametrically opposed portions of the shank in continuation of the surface contour of the shank above and below said corrugations.

4. In a wire nail having a pointed cylindrical shank, groups of corrugations on opposite side portions of the shank arranged with the corrugations extending in the direction of their lengths circumferentially of the shank, said groups of corrugations being wedge shaped both laterally and radially of the shank with the small end portion thereof presented to the pointed end of the shank.

SEBASTIAN KRAEMER.